United States Patent [19]

Irie

[11] Patent Number: 4,971,538
[45] Date of Patent: Nov. 20, 1990

[54] TIRE VULCANIZING PRESS
[75] Inventor: Nobuhiko Irie, Nagasaki, Japan
[73] Assignee: Mitsubishi Jukogyo Kabushiki Kaisha, Tokyo, Japan
[21] Appl. No.: 363,200
[22] Filed: Jun. 8, 1989
[30] Foreign Application Priority Data
    Jun. 14, 1988 [JP] Japan .................. 63-144612
[51] Int. Cl.$^5$ .................................. B29C 35/00
[52] U.S. Cl. ........................................ 425/28.1
[58] Field of Search ............ 425/28.1, 34.1, 35, 425/32, 38, 40, 47

[56]           References Cited
         U.S. PATENT DOCUMENTS

| | | | |
|---|---|---|---|
| 2,343,881 | 3/1944 | Brundage | 425/34.1 |
| 3,065,499 | 11/1962 | Brundage et al. | 425/38 |
| 3,065,503 | 11/1962 | Mallory et al. | 425/38 |
| 3,097,394 | 7/1963 | Mallory et al. | 425/38 |
| 3,141,191 | 7/1964 | Soderquist | 425/38 |
| 3,734,656 | 5/1973 | Balle | 425/34.1 |
| 3,854,852 | 12/1974 | Carter | 425/28.1 |
| 4,725,212 | 2/1988 | Singh | 425/38 |
| 4,741,682 | 5/1988 | Mauro | 425/28.1 |

Primary Examiner—Willard Hoag
Attorney, Agent, or Firm—Wenderoth, Lind & Ponack

[57] ABSTRACT

A tire vulcanizing press includes a vertically movable upper die closable over a lower die, a guide roller mounted on support structure of the upper die, a nearly horizontal roller guide way provided on a rear top portion of a press body, a vertical roller guide groove provided with a notch extending upward of the roller guide way and communicating therewith on the front top portion of the press body at the rear of a vertically intermediate portion thereof, a counter-rotatable crank gear, and a crank arm coupling a crank pin mounted at an eccentric position of the crank gear with the upper die support structure. When the press is operated during normal tire production, the crank gear is rotated in one direction, the crank pin is shifted from a bottom dead point to a top dead point, and movement of the crank pin is transferred to the upper die support structure through the crank arm, thus shifting the guide roller from a lower end portion to an upper end portion of the vertical roller guide groove.

4 Claims, 2 Drawing Sheets 4,971,538

1

TIRE VULCANIZING PRESS

BACKGROUND OF THE INVENTION

1. Field of the Invention

The present invention relates to a tire vulcanizing press.

2. Description of the Prior Art

Referring to a prior art tire vulcanizing press according to FIG. 2, reference numeral (01) denotes one press body (side plate) of a pair, and (02) a base. Each press body (01) is fixed on a respective one of opposite sides of the base (02). Reference numeral (03) denotes a vertical roller guide groove provided on a front top portion of each press body (01), (04) a nearly horizontal roller guide way provided on a rear top portion of each press body (01), (05) a beam (upper die support structure), (06) a beam shaft projecting outward of opposite end portions of the beam (05), and (07) one of a pair of guide rollers (beam rollers) which are supported rotatably on each beam shaft (06) at ends thereof. Each guide roller (07) is rollably supported in the vertical roller guide groove (03) of each press body (01). Reference numeral (08) denotes a crank gear, and character (A) denotes a center of rotation of the crank gear (08), the center of rotation (A) and a vertical center line of the vertical roller guide groove (03) lying in the same vertical plane. Further, (09) denotes a motor operatively connected to a reduction device, (010) a pinion driven by the motor (09), the pinion (010) engaging the crank gear (08). Reference numeral (011) denotes a crank pin mounted on the crank gear (08) at an eccentric position, and (012) a crank arm (side link). A lower end portion of the crank arm (012) is mounted rotatably on the crank gear (08) through the crank pin (011), and an upper end portion of the crank arm (012) is mounted rotatably on the beam shaft (06). Further, reference numeral (013) denotes an upper can supported on the beam (05), and an upper die and an upper pressure plate are incorporated in the upper can (013). Reference numeral (014) denotes a lower can supported on the base (02), and a lower die and a lower pressure plate are incorporated in the lower can (014). When the motor (09) coupled with the reduction device is driven, such rotation is transferred to the crank gear (08) through the pinion (010). The crank gear (08) is thus rotated around the center of rotation (A) in the direction indicated by an arrow X, the crank pin (011) is shifted from a bottom dead point ($B_1$) to a last point ($B_5$) by way of an intermediate point ($B_2$)→an intermediate point ($B_3$) and→a top dead point ($B_4$). The crank arm (012) is thus cranked, and when the crank pin (011) shifts from the bottom dead point ($B_1$) to the intermediate point ($B_2$), the guide roller (07) is elevated along the vertical roller guide groove (03) (($C_1$)→($C_2$)), the beam shaft (06) and the beam (05) and the upper can (013) are elevated vertically, and the upper can (013) is isolated from the lower can (014) by an interval (l). Then, when the crank pin (011) shifts→ the intermediate point ($B_3$)→the top dead point ($B_4$) and→the last point ($B_5$), the beam roller (07) is brought out of the vertical roller guide groove (03) to roll on the nearly horizontal roller guide way (04) (($C_3$)→($C_4$)→($C_5$)), the beam shaft (06) and the beam (05) and the upper can (013) are shifted rearward to facilitate the removal of tires, the feeding of half-finished goods, and maintenance such as the replacement of dies and so forth. Then, when these operations are over, the crank gear (08) is rotated counted to the direction mentioned above, the upper can (013) is returned to a closed position, and a tire vulcanizing process is recommenced.

In the prior art tire vulcanizing press shown in FIG. 2, the interval (l) between the upper can (013) and the lower can (014) is not sufficient to facilitate the removal of tires, the feeding of half-finished goods, and maintenance such as the replacement of dies and so forth. Therefore, a satisfactory interval must be provided between the upper can (013) and the lower can (014) by moving the upper can (013) rearward along the nearly horizontal roller guide way (04). The upper can (013) is so moved during a normal operation of tire production and at the time maintenance such as die replacement or the like, which gives rise to the following problem. That is, since the guide roller (beam roller) (07) rolls on the nearly horizontal roller guide way (04) rearwards while bearing the full weight of the upper can (013), the guide roller (07) and the nearly horizontal roller guide way (04) are relatively worn out shortly, and particularly when the guide roller (07) is worn out, a gap between the beam roller (07) and the vertical roller guide groove (03) increases, a concentricity between the upper can (013) and the lower can (014) is not obtainable, and thus a precision of the produced tire deteriorates.

SUMMARY OF THE INVENTION

The present invention has been proposed in view of the aforementioned problem, and its object is to provide a tire vulcanizing press whereby the precision at which tires are produced can be enhanced.

To attain the above object, a tire vulcanizing press according to the invention comprises a vertically movable upper die closable over a lower die, a guide roller mounted on support structure of the upper die, a nearly horizontal roller guide way provided on a rear top of a press body, a vertical roller guide groove extending at a front top portion of the press body upward of the roller guide way and defining a notch at the rear of a vertically intermediate portion thereof to communicate with the roller guide way, a counter-rotatable crank gear, and a crank arm connecting a crank pin mounted at an eccentric position of the crank gear and the support structure together.

When the tire vulcanizing press of the invention having the structure mentioned above is operated during normal tire production, the crank gear is rotated in one direction, the crank pin mounted at an eccentric position of the crank gear is shifted from a bottom dead point to a top dead point, movement of the crank pin is transferred to support structure of the upper die through the crank arm, and thus the guide roller is shifted from a lower end portion to an upper end portion of the vertical roller guide groove. On the other hand, when maintenance such as die replacement or the like is to be performed, the crank gear is rotated in the counter direction, the crank pin is shifted from the bottom dead point to a position over the top dead point, movement of the crank pin is transferred to the support structure of the upper die, and thus the guide roller is shifted from a lower portion of the vertical roller guide groove→a notch provided on the rear side of a vertically intermediate portion of the vertical roller guide groove and along the almost horizontal roller guide way.

DETAILED DESCRIPTION OF THE PREFERRED EMBODIMENT

Figure 1:
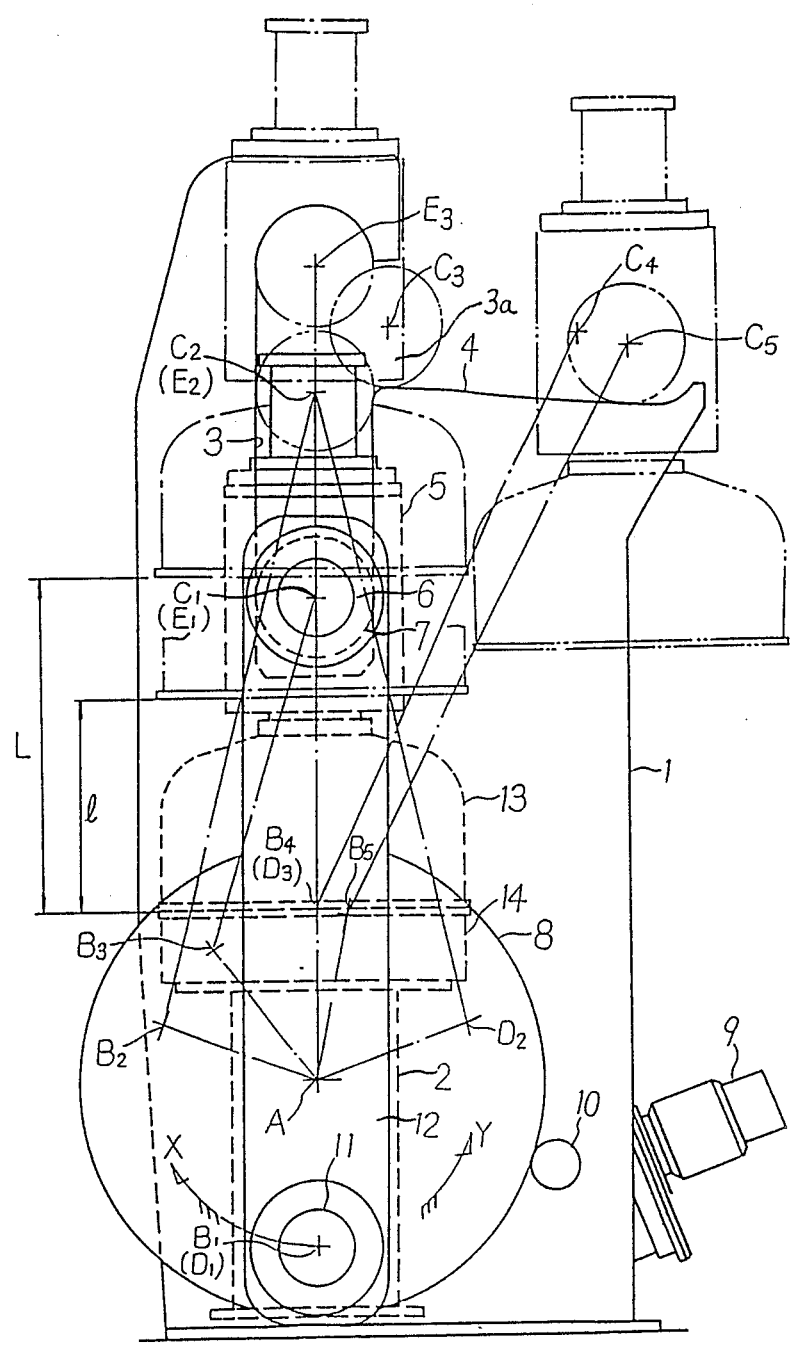
FIG. 1 is a side view of a tire vulcanizing press according to one embodiment of the invention.
Figure 2:
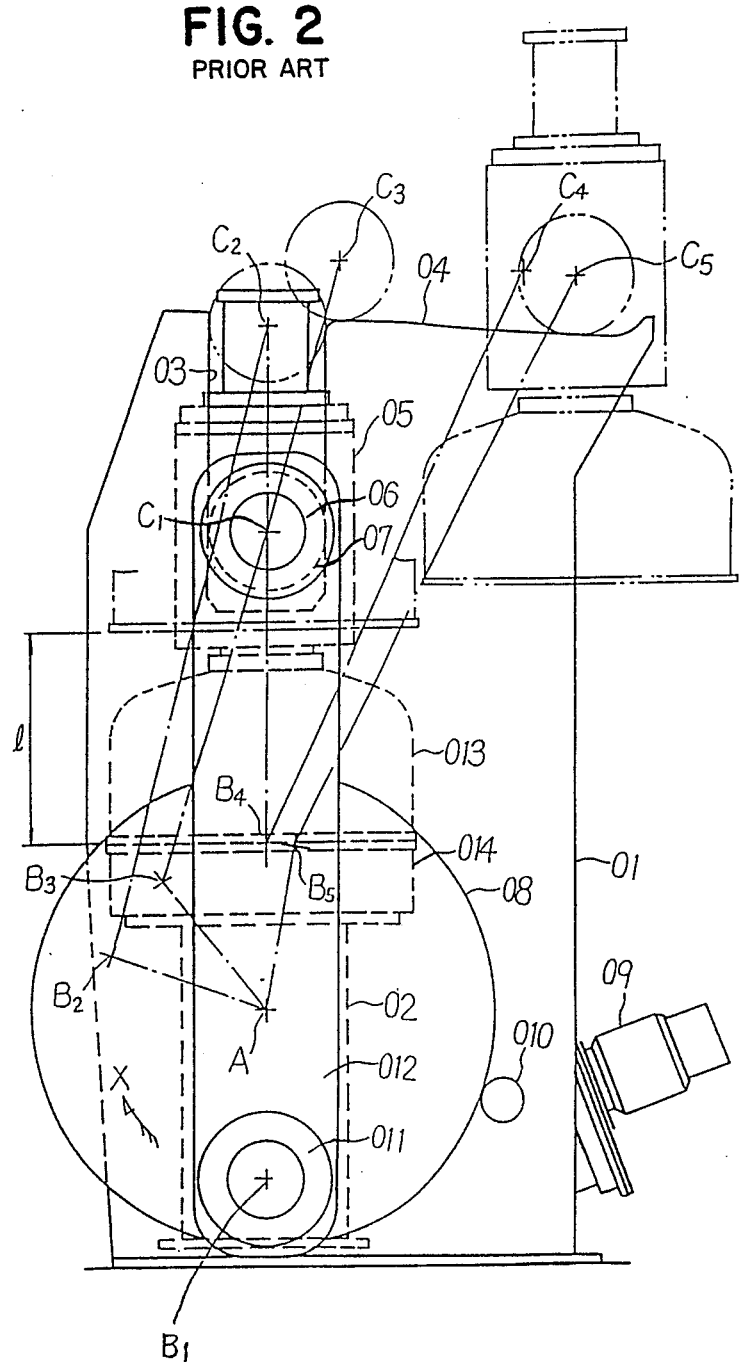
FIG. 2 is a side view of a prior art tire vulcanizing press.

Referring next to FIG. 1, representing one preferred embodiment of the tire vulcanizing press according to the invention, numeral (1) denotes one press body (side plate) of a pair, and (2) a base. Each press body (1) is fixed on a respective one of opposite sides of the base (2). Numeral (3) denotes a vertical roller guide groove provided on a front top portion of each press body (1), and (4) an almost horizontal roller guide way provided on a rear top portion of each press body (1). The vertical roller guide groove (3) extends upward of the roller guide way (4). A notch (3a) is defined at a rear side of the vertically intermediate portion of the vertical roller guide groove (3), and the notch (3a) opens to the roller guide way (4). Numeral (5) denotes a beam (support structure of the upper die), (6) a beam shaft projecting outward of opposite end portions of the beam (5), and (7) one of a pair of guide rollers (beam rollers) which are supported rotatably on the beam shaft (6) at ends thereof. Each guide roller (7) is rollably supported in the vertical roller guide groove (3) of each press body (1). Numeral (8) denotes a crank gear which is counter-rotatable in direction (Y) and direction (X) by a motor (9) via a reduction device described hereinlater. Further, (A) denotes a center of rotation of the crank gear (8), the center of rotation (A) and a vertical center line of the vertical roller guide groove (3) lying in the same vertical plane. Numeral (10) denotes a pinion driven by the motor (9), the pinion (10) engaging the crank gear (8). Numeral (11) denotes a crank pin mounted at an eccentric position on the crank gear (8), and (12) a crank arm (side link). A lower end portion of the crank arm (12) is mounted rotatably on the crank gear (8) through the crank pin (11), and an upper end portion of the crank arm (12) is mounted rotatably on the beam shaft (6). Numeral (13) denotes an upper can supported on the beam (5), and an upper die and an upper pressure plate are incorporated in the upper can (13). Further, numeral (14) denotes a lower can supported on the base (2), and a lower die and a lower pressure plate are incorporated in the lower can (14). While not illustrated therein, a known stabilizing roller is used for maintaining the upper die support structure horizontal; structure similar to that defining the vertical roller guide groove (3) is also used on a guide part of the stabilizing roller.

Next, the operation of the tire vulcanizing press shown in FIG. 1 will be described in detail.

At the time of normal tire production, the motor (9) operatively connected to a reduction device is driven in one direction, such rotation being transferred to the crank gear (8) through the pinion (10). The crank gear (8) is thus rotated in one direction (Y) around the center of rotation (A). The crank pin (11) is shifted from a bottom dead point ($D_1$)→an intermediate point ($D_2$) and→a top dead point ($D_3$) As the crank arm (12) is cranked, the guide roller (6) is elevated from a lower end position ($E_1$) to an upper end position ($E_3$) of the vertical roller guide groove (3), thus elevating the beam shaft (6), the beam (5) and the upper can (13). In this case, a gap L which is larger than l is formed between the upper can (13) and the lower can (14), which is effective in allowing the removal of tires, the feeding of half-finished goods and so forth, smoothly. When the operations of removing tires, feeding half-finished goods and the like are completed, the crank gear (8) is rotated in the counter direction, the upper can (13) is brought down along the vertical roller guide groove (3), and the upper die and the lower die are closed to tire vulcanization. In the embodiment, l=1,020 mm, and L=1,660 mm. Therefore, the vertical stroke is larger than that of the prior art by L−l=640 mm or so (about 63%). The interval L is large enough to allow large radial tires to be removed and half-finished goods to be fed, and hence, no problems will occur during tire production.

On the other hand, at the time of maintenance such as replacement of dies or the like, the motor (9) coupled with a reduction device is driven in the other direction, the rotation is transferred to the crank gear (8) through the pinion (10), the crank gear (8) is thus rotated in the direction (X) around the center of rotation (A), and the crank pin (11) is shifted from the bottom dead point ($B_1$) to the last point ($B_5$) through the intermediate point ($B_2$) the intermediate point ($B_3$) and→the top dead point ($B_4$), and the crank arm (12) is cranked. When the crank pin (11) shifts from the bottom dead point ($B_1$) to the intermediate point ($B_2$), the guide roller (7) is elevated along a lower portion of the vertical roller guide groove (3) (($C_1$)→($C_2$)), the beam shaft (6) and the beam (5) and the upper can (13) are elevated, and the upper can (13) is isolated from the lower can (14) by the interval (l). Then, when the crank pin (11) shifts from the intermediate point ($B_3$)→the top dead point ($B_4$) and→the last point ($B_5$), the beam roller (7) is forced out of the notch (3a) defined by the vertical roller guide groove (3) as the notch is unobstructed, and is rolled on the nearly horizontal roller guide way (4) (($C_3$)→($C_4$)→($C_5$)). The beam shaft (6), the beam (5) and the upper can (13) are thus shifted rearwards to allow maintenance such as the replacement of dies and the like to be carried out. Then, when the maintenance such as the replacement of dies and the like is completed, the crank gear (8) is rotated in the counter-direction, and the upper can (13) is returned to a closed position to recommence the operation of tire vulcanization.

As described above, when the tire vulcanizing press of the invention operates during normal tire production, the crank gear is rotated in one direction, the crank pin mounted at an eccentric position of the crank gear is shifted from a bottom dead point to a top dead point, movement of the crank pin is transferred to the upper die support structure through the crank arm, and the guide roller is shifted from a lower end portion to an upper end portion of the vertical roller guide groove. On the other hand, at the time of maintenance such as die replacement or the like, the crank gear is rotated in the counter direction, the crank pin is thus shifted from the bottom dead point to a position over the top dead point, movement of the crank pin is transferred to the upper die support structure through the crank arm, and the guide roller is shifted from a lower portion of the vertical roller guide groove to the nearly horizontal roller guide way through the notch which is defined at the rear side of a vertical intermediate portion of the vertical roller guide groove. Thus, the guide roller is shifted rearwards along the nearly horizontal roller guide way which bears the weight of the upper die and its support structure only at the time of maintenance such as die replacement or the like. Therefore, wear on the guide roller can be prevented satisfactorily, and a proper gap between the guide roller and the vertical roller guide groove can be maintained for a longer period of time, thus enhancing the precision at which tires are produced.

What is claimed is:

1. A tire vulcanizing press comprising:
   a press body defining a nearly horizontal roller guide way at a rear top portion thereof, a roller guide groove extending vertically therein and having a lower end portion, an intermediate portion, and an upper end portion extending upwardly of said roller guide way at a front top portion of the press body, and a notch at the rear of said roller guide groove and open between the intermediate portion of said roller guide groove and said roller guide way,
   said notch being free of obstructions so that the intermediate portion of said roller guide groove is open to said roller guide way during a normal operation of producing tires in the press;
   a lower die mounted in the press;
   an upper die movably mounted in the press, support structure connected to said upper die for supporting said upper die in the press; and a guide roller rotatably mounted to said support structure,
   guide roller being guidable by said press body within the roller guide groove thereof so as to guide said upper die vertically within the press toward and away from said lower die during said normal operation of producing tires in the press, and said guide roller being guidable by the roller guide way of the press body when maintenance is to be performed on the press;
   a counter-rotatable crank rotatably supported in the press about a center of rotation;
   a crank pin mounted to said crank at a location thereon spaced from said center of rotation;
   a crank arm coupling said crank pin with said support structure; and
   means for rotating said crank in one of two directions of rotation that causes said guide roller to bear against the press body at the front of said roller guide groove and thus move into the upper end portion of said roller guide groove when said upper die is to be moved away from said lower die during said normal operation of producing tires in the press, and for rotating said crank in the other of said two directions of rotation that causes said guide roller to bear against the press body at the rear of said roller guide groove and thus move through said notch onto said roller guide way when maintenance is to be performed on the press.

2. A tire vulcanizing press as claimed in claim 1, wherein said means for rotating comprises a reversible motor operatively connected to said crank.

3. A tire vulcanizing press as claimed in claim 1, wherein said crank comprises a gear.

4. A tire vulcanizing press as claimed in claim 3, wherein said means for rotating comprises a pinion engaging said gear, and a reversible motor operatively connected to said pinion for rotating said pinion.

* * * * *